(12) United States Patent
Agarwal et al.

(10) Patent No.: US 8,114,929 B2
(45) Date of Patent: Feb. 14, 2012

(54) TRANSPARENT POLYCARBONATE-POLYESTER BLENDS WITH IMPROVED PERFORMANCE UNDER CAUSTIC AQUEOUS ENVIRONMENTS

(75) Inventors: Parminder Agarwal, Evansville, IN (US); Rodney W. Fonseca, Newburgh, IN (US)

(73) Assignee: Sabic Innovative Plastics IP B.V. (NL)

( * ) Notice: Subject to any disclaimer, the term of this patent is extended or adjusted under 35 U.S.C. 154(b) by 674 days.

(21) Appl. No.: 11/612,937

(22) Filed: Dec. 19, 2006

(65) Prior Publication Data

US 2008/0000917 A1    Jan. 3, 2008

Related U.S. Application Data

(60) Provisional application No. 60/806,499, filed on Jul. 3, 2006.

(51) Int. Cl.
*C08L 69/00* (2006.01)
*C08L 67/02* (2006.01)

(52) U.S. Cl. ........ 524/128; 524/147; 524/151; 524/227; 524/228; 524/230; 524/232; 524/311; 524/320; 524/322; 524/385; 524/386; 524/415; 524/417; 525/133; 525/148; 525/439; 525/462

(58) Field of Classification Search .................. None
See application file for complete search history.

(56) References Cited

U.S. PATENT DOCUMENTS

| 3,166,606 | A | * | 1/1965 | Reinking et al. ............. 525/439 |
| 4,391,954 | A |  | 7/1983 | Scott |
| 4,996,248 | A |  | 2/1991 | Nelson et al. |
| 5,055,523 | A | * | 10/1991 | Inoue et al. .................. 525/148 |
| 5,424,361 | A |  | 6/1995 | DeRudder |
| 6,896,966 | B2 |  | 5/2005 | Crawford et al. |
| 2005/0065293 | A1 | * | 3/2005 | Vollenberg et al. ........... 525/461 |
| 2005/0113534 | A1 |  | 5/2005 | Agarwal et al. |
| 2005/0228130 | A1 |  | 10/2005 | Kalyanaraman et al. |

FOREIGN PATENT DOCUMENTS

| EP | 542464 | * | 5/1993 |
| EP | 0551687 A1 | | 7/1993 |
| EP | 0687710 A2 | | 12/1995 |
| WO | WO9109911 A1 | | 7/1991 |
| WO | 03004561 A2 | | 1/2003 |
| WO | 03004561 A3 | | 1/2003 |
| WO | 2004110902 A1 | | 12/2004 |

OTHER PUBLICATIONS

Polymer Science and Technology vol. 7; 2003; p. 397-402.*
International Search Report for PCT/US2007/069356 International Filing Date May 21, 2007, Mailing date Dec. 27, 2007 (6 pages).
Written Opinion of the International Searching Authority for PCT/US2007/069356 International Filing Date May 21, 2007, Mailing date Dec. 27, 2007 (6 pages).

* cited by examiner

*Primary Examiner* — David Buttner
(74) *Attorney, Agent, or Firm* — Cantor Colburn LLP; Diderico van Eyl

(57) ABSTRACT

A composition comprising a clear thermoplastic blend comprising: (a) a polycarbonate component; and (b) a polyester component comprising (i) a polyester based substantially on 1,4 cyclohexane dimethanol and terephthalic acid monomer units, (ii) copolymers polyester based substantially on 1,4 cyclohexane dimethanol and terephthalic acid monomer units and modified with up to 25 mol % of copolymerizable acid and/or diol monomers, and (iii) combinations thereof. The polycarbonate component and the polyester component are present in sufficient proportions to form a molding composition capable of being molded into an article that exhibits transparency and structural integrity after the article is exposed to a caustic aqueous environment for at least 70 hours. The invention also relates to articles made from the composition, methods for making the compositions, and methods for using articles.

18 Claims, No Drawings

TRANSPARENT POLYCARBONATE-POLYESTER BLENDS WITH IMPROVED PERFORMANCE UNDER CAUSTIC AQUEOUS ENVIRONMENTS

CROSS REFERENCE TO RELATED APPLICATIONS

This application claims priority to U.S. Provisional Application Ser. No. 60/806,499 filed on Jul. 3, 2006, which is incorporated herein by reference in its entirety.

BACKGROUND OF THE INVENTION

Polycarbonate is a useful engineering plastic for parts requiring clarity, high toughness, and, in some cases, good heat resistance. However, polycarbonate also has some important deficiencies, among them poor chemical and stress crack resistance, poor resistance to sterilization by gamma radiation, and poor processability. Blends of polyesters with polycarbonates provide thermoplastic compositions having improved properties over those based upon either of the single resins alone. Moreover, such blends are often more cost effective than polycarbonate alone.

Transparent, miscible compositions of any two polymers are rare. The term "miscible", as used in the specification, refers to compositions that are a mixture on a molecular level wherein intimate polymer-polymer interaction is achieved. Miscible compositions are transparent, not opaque. In addition, differential scanning calorimetry Testing detects only a single glass transition temperature (Tg) for miscible blends composed of two or more components. Thus miscibility of PC with the polyesters gives the blends the clarity needed. There have been very few clear polycarbonate/polyester blends developed. U.S. Pat. Nos. 4,619,976 and 4,645,802 disclose clear blends based on bisphenol A polycarbonate with polyesters of poly(1,4-tetramethylene terephthalate), poly(1,4-cyclohexylenedimethylene terephthalate) and selected copolyesters and copoly (ester-imides) of poly(1,4-cyclohexylenedimethylene terephthalate). U.S. Pat. No. 4,786,692 discloses clear blends of bisphenol A polycarbonate and polyesters of terephthalic acid, isophthalic acid, ethylene glycol, and 1,4-cyclohexanedimethanol. U.S. Pat. Nos. 4,188,314 and 4,391,954 disclose clear blends of bisphenol A polycarbonate with poly(1,4-cyclohexylenedimethylene terephthalate-co-isophthalate). These polyester blends do have improved chemical resistance and melt processability, when compared to unblended bisphenol A polycarbonate. However, the good heat resistance and impact strength of bisphenol A polycarbonate blends based on these compositions is reduced significantly. U.S. Pat. Nos. 4,188,314, 4,125,572; 4,391,954; 4,786,692; 4,897,453, and 5,478,896 relate to blends of an aromatic polycarbonate and poly cyclohexane dimethanol phthalate. U.S. Pat. No. 4,125,572 relates to a blend of polycarbonate, polybutylene terephthalate (PBT) and an aliphatic/cycloaliphatic iso/terephthalate resin. U.S. Pat. No. 6,281,299 discloses a process for manufacturing transparent polyester/polycarbonate compositions, wherein the polyester is fed into the reactor after bisphenol A is polymerized to a polycarbonate.

Plastic products face a variety of caustic aqueous environments such as extreme heat and humidity; pH; chemical environment; and the like. The performances of plastics deteriorate exponentially when these harsh environments are present as a combination. Environments created by dishwashers, for instance, are one such example where chemical environment is present in combination with high heat and humidity.

For the foregoing reasons, there is an ongoing need to develop improved compositions that are suitable for extreme environments.

For the foregoing reasons, there is an ongoing need to develop improved methods for making such compositions that are suitable for extreme environments.

For the foregoing reasons, there is an ongoing need to develop articles from such compositions that are suitable for extreme environments.

BRIEF DESCRIPTION OF THE INVENTION

The invention relates to a composition comprising a clear thermoplastic blend comprising:
(a) a polycarbonate component;
(b) a polyester component comprising (i) a polyester based substantially on 1,4 cyclohexane dimethanol and terephthalic acid monomer units, (ii) copolymers polyester based substantially on 1,4 cyclohexane dimethanol and terephthalic acid monomer units and modified with up to 25 mol % of copolymerizable acid and/or diol monomers, and (iii) combinations thereof; such that the polycarbonate component and the polyester component are present in sufficient proportions to form a molding composition capable of being molded into an article that exhibits transparency and structural integrity after the article is exposed to a caustic aqueous environment having (1) a temperature that is at least 70° C., (2) a humidity of at least 80%, and (3) a pH that is more than 7 for at least 70 hours.

In one embodiment, the invention relates to articles made from such compositions.

In another embodiment, the invention relates to a composition comprising a clear thermoplastic blend comprising:
(a) from 20 to 90 wt % of a polycarbonate component;
(b) from 10 to 50% of a polyester component comprising (i) a polyester based substantially on 1,4 cyclohexane dimethanol and terephthalic acid monomer units, (ii) copolymers polyester based substantially on 1,4 cyclohexane dimethanol and terephthalic acid monomer units and modified with up to 25 mol % of copolymerizable acid and/or diol monomers, and (iii) combinations thereof; and
(c) from 0.001 to 10 wt % of a quencher component;
wherein the wt % sum of (a), (b), and (c) is 100 wt %.

In another embodiment, the invention relates to a composition comprising a clear thermoplastic blend comprising:
(a) from 15 to 40 wt % of a first polycarbonate component having a molecular weight ranging from 18,000 to 25,000 grams/mole, as measured by Gel Permeation Chromotography GPC using polystyrene standards;
(b) from 5 to 55 wt % of a second polycarbonate component having a molecular weight ranging from 32,000 to 40,000 grams/mole, as measured by Gel Permeation Chromotography GPC using polystyrene standards;
(c) from 15 to 35 wt. %, based on the total weight of the composition, of poly(1,4-cyclohexanedimethylene terephthalate)
(d) from 0 to 0.5 wt % of a mold release selected from the group consisting of polyethylene waxes, fluorocarbons, and other hydrocarbon mold-release agents; stearic acid, hydroxystearic acid, and other higher fatty acids, hydroxyfatty acids, and other fatty acid mold-release agents; stearic acid amide, ethylenebisstearamide, and other fatty acid amides, alkylenebisfatty acid amides, and other fatty acid amide mold-release agents; stearyl alcohol, cetyl alcohol, and other aliphatic alcohols, polyhydric alcohols, polyglycols, polyglycerols and other alcoholic mold release agents; butyl stearate, pentaerythritol tetrastearate, and other lower alcohol esters of fatty acid, polyhydric alcohol esters of fatty acid, polyglycol esters of fatty acid, (e) from 0 to 1 wt % of a stabilizer selected from the group consisting of acidic phosphate salts; mixed phosphites having at least one acidic hydrogen; Group IB or Group IIB metal phosphate salts, phosphorus oxo acid, metal acid pyrophosphate, Tetrakis(2,4-di-tert-butylphenyl)-4,4'-biphenylene diphosphonite, phosphoric acid, (f) from 0 to 1 wt % of a polyfunctional carboxy reactive material (styrene acrylate copolymer with glycidyl groups);

(g) from 0 to 1 wt % of an ultraviolet absorber selected from the group consisting of salicylic acid ultraviolet absorbers, benzophenone ultraviolet absorbers, benzotriazole ultraviolet absorbers, cyanoacrylate ultraviolet absorbers and mixtures thereof;

wherein the sum of the wt % of (a), (b), (c), (d), (e), (f), and (g) is 100 wt %. The embodiments of the invention also include articles derived from this composition.

DETAILED DESCRIPTION OF THE INVENTION

The invention is based on the discovery that by using a certain combination of components, it is possible to develop compositions that is particularly suitable for caustic aqueous environments, e.g., extreme environments such as extreme heat and humidity; pH; chemical environment. The compositions are particularly useful for making plastic parts that are exposed to caustic aqueous environments in their ordinary use, e.g., dishwasher parts or bowls.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

The term "structural integrity," as used herein, refers to an article that does not exhibit any visible cracks.

The term "transparency" refers to the clarity of a plastic. Transparency can be measured with a Gretag Macbeth Spectrophotometer. The test method used is ASTM D 1003, and is widely known. Measurements can be performed on a 100 mil plaque in transmission mode.

The term "caustic aqueous environment" means an aqueous environment that has a temperature that is at least 70° C., (2) a humidity of at least 80%, and (3) a pH that is more than 7.

The polycarbonate component of the molding composition is described below. As used herein, the terms "polycarbonate" and "polycarbonate resin" mean compositions having repeating structural carbonate units of the formula (1):

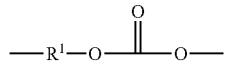  (1)

in which at least 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

  (2)

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

As used herein, the term "aliphatic" refers to a hydrocarbon radical having a valence of at least one comprising a linear or branched array of carbon atoms which is not cyclic; "aromatic" refers to a radical having a valence of at least one comprising at least one aromatic group; "cycloaliphatic" refers to a radical having a valence of at least one comprising an array of carbon atoms which is cyclic but not aromatic; "alkyl" refers to a straight or branched chain monovalent hydrocarbon radical; "alkylene" refers to a straight or branched chain divalent hydrocarbon radical; "alkylidene" refers to a straight or branched chain divalent hydrocarbon radical, with both valences on a single common carbon atom; "alkenyl" refers to a straight or branched chain monovalent hydrocarbon radical having at least two carbons joined by a carbon-carbon double bond; "cycloalkyl" refers to a non-aromatic alicyclic monovalent hydrocarbon radical having at least three carbon atoms, with at least one degree of unsaturation; "cycloalkylene" refers to a non-aromatic alicyclic divalent hydrocarbon radical having at least three carbon atoms, with at least one degree of unsaturation; "aryl" refers to a monovalent aromatic benzene ring radical, or to an optionally substituted benzene ring system radical system fused to at least one optionally substituted benzene rings; "arylene" refers to a benzene ring diradical or to a benzene ring system diradical fused to at least one optionally substituted benzene rings; "acyl" refers to a monovalent hydrocarbon radical joined to a carbonyl carbon atom, wherein the carbonyl carbon further connects to an adjoining group; "alkylaryl" refers to an alkyl group as defined above substituted onto an aryl as defined above; "arylalkyl" refers to an aryl group as defined above substituted onto an alkyl as defined above; "alkoxy" refers to an alkyl group as defined above connected through an oxygen radical to an adjoining group; "aryloxy" refers to an aryl group as defined above connected through an oxygen radical to an adjoining group; and "direct bond", where part of a structural variable specification, refers to the direct joining of the substituents preceding and succeeding the variable taken as a "direct bond."

Polycarbonates may be produced by the interfacial reaction of dihydroxy compounds having the formula HO—$R^1$—OH, which includes dihydroxy compounds of formula (3):

  (3)

wherein $Y^1$, $A^1$ and $A^2$ are as described above. Also included are bisphenol compounds of general formula (4):

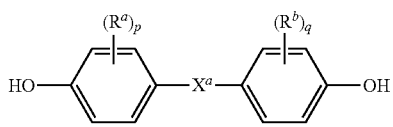

(4)

wherein $R^a$ and $R^b$ each represent a halogen atom or a monovalent hydrocarbon group and may be the same or different; p and q are each independently integers of 0 to 4; and $X^a$ represents one of the groups of formula (5):

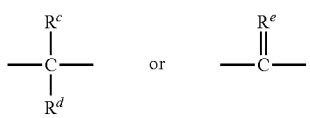

(5)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromo-phenyl) propane, 1,1-bis (hydroxyphenyl)cyclopentane, 1,1-bis(4-hydroxyphenyl)cyclohexane, 1,1-bis(4-hydroxy-3 methyl phenyl)cyclohexane 1,1-bis(4-hydroxyphenyl)isobutene, 1,1-bis(4-hydroxyphenyl)cyclododecane, 6,6'-dihydroxy-3, 3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds represented by formula (3) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents may be added at a level of 0.05 to 2.0 wt. % of the polycarbonate. All types of polycarbonate end groups are contemplated as being useful in the polycarbonate, provided that such end groups do not significantly affect desired properties of the thermoplastic compositions.

In a specific embodiment, the polycarbonate is a linear homopolymer derived from bisphenol A, in which each of $A^1$ and $A^2$ is p-phenylene and $Y^1$ is isopropylidene. The polycarbonates may have an intrinsic viscosity, as determined in chloroform at 25° C., of 0.3 to 1.5 deciliters per gram (dl/g), specifically 0.45 to 1.0 dl/g. The polycarbonates may have a weight average molecular weight (Mw) of 10,000 to 100,000, as measured by gel permeation chromatography (GPC) using a crosslinked styrene-divinyl benzene column, at a sample concentration of 1 milligram per milliliter, and as calibrated with polycarbonate standards.

"Polycarbonates" and "polycarbonate resin" as used herein may include copolymers comprising carbonate chain units. A specific suitable copolymer is a polyester-polycarbonate, also known as a copolyester-polycarbonate and polyester-carbonate. Combinations of polycarbonates and polyester-polycarbonates may also be used. As used herein, a "combination" is inclusive of all mixtures, blends, alloys, reaction products, and the like. Polyester-polycarbonates contain, in addition to recurring carbonate chain units of the formula (1), repeating units of formula (6):

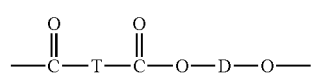

(6)

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (7):

(7)

wherein each $R^f$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is 91:1 to 2:98. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In addition to the ester units, the polyester-polycarbonates comprise carbonate units as described hereinabove. Carbonate units of formula (1) may also be derived from aromatic dihydroxy compounds of formula (7), wherein specific carbonate units are resorcinol carbonate units.

Specifically, the polyester unit of a polyester-polycarbonate can be derived from the reaction of a combination of isophthalic and terephthalic diacids (or derivatives thereof) with resorcinol, bisphenol A, or a combination comprising one or more of these, wherein the molar ratio of isophthalate units to terephthalate units is 91:9 to 2:98, specifically 85:15 to 3:97, more specifically 80:20 to 5:95, and still more specifically 70:30 to 10:90. The polycarbonate units can be derived from resorcinol and/or bisphenol A, in a molar ratio of resorcinol carbonate units to bisphenol A carbonate units of 0:100 to 99:1, and the molar ratio of the mixed isophthalate-terephthalate polyester units to the polycarbonate units in the polyester-polycarbonate can be 1:99 to 99:1, specifically 5:95 to 90:10, more specifically 10:90 to 80:20. Where a blend of polyester-polycarbonate with polycarbonate is used, the weight ratio of polycarbonate to polyester-polycarbonate in the blend can be, respectively, 1:99 to 99:1, specifically 10:90 to 90:10.

The polyester-polycarbonates may have a weight-averaged molecular weight (Mw) of 1,500 to 100,000, specifically 1,700 to 50,000, and more specifically 2,000 to 40,000. Molecular weight determinations are performed using gel permeation chromatography (GPC), using a crosslinked styrene-divinylbenzene column and calibrated to polycarbonate references. Samples are prepared at a concentration of about 1 mg/ml, and are eluted at a flow rate of about 1.0 ml/min.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., 8 to 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used. A chain stopper (also referred to as a capping agent) may be included during polymerization. The chain-stopper limits molecular weight growth rate, and so controls molecular weight in the polycarbonate. A chain-stopper may be at least one of mono-phenolic compounds, mono-carboxylic acid chlorides, and/or mono-chloroformates.

For example, mono-phenolic compounds suitable as chain stoppers include monocyclic phenols, such as phenol, $C_1$-$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms. A mono-phenolic UV absorber may be used as capping agent. Such compounds include 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Specifically, mono-phenolic chain-stoppers include phenol, p-cumylphenol, and/or resorcinol monobenzoate.

Mono-carboxylic acid chlorides may also be suitable as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides such as trimellitic anhydride chloride, and naphthoyl chloride; and mixtures of monocyclic and polycyclic mono-carboxylic acid chlorides. Chlorides of aliphatic monocarboxylic acids with up to 22 carbon atoms are suitable. Functionalized chlorides of aliphatic monocarboxylic acids, such as acryloyl chloride and methacryoyl chloride, are also suitable. Also suitable are mono-chloroformates including monocyclic, mono-chloroformates, such as phenyl chloroformate, alkyl-substituted phenyl chloroformate, p-cumyl phenyl chloroformate, toluene chloroformate, and mixtures thereof.

The polyester-polycarbonates may be prepared by interfacial polymerization. Rather than utilizing the dicarboxylic acid per se, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, or mixtures thereof, it is possible to employ isophthaloyl dichloride, terephthaloyl dichloride, and mixtures thereof.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst may be 0.1 to 10 wt % based on the weight of bisphenol in the phosgenation mixture. In another embodiment an effective amount of phase transfer catalyst may be 0.5 to 2 wt % based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Examples of the carbonic acid diesters that may be utilized to produce the polycarbonates are diphenyl carbonate, bis(2,4-dichlorophenyl)carbonate, bis(2,4,6-trichlorophenyl)carbonate, bis (2-cyanophenyl)carbonate, bis(o-nitrophenyl)carbonate, ditolyl carbonate, m-cresyl carbonate, dinaphthyl carbonate, bis(diphenyl)carbonate, diethyl carbonate, dimethyl carbonate, dibutyl carbonate, dicyclohexyl carbonate, and the like, as well as combinations comprising at least one of the foregoing carbonic acid diesters. The preferred carbonic acid diester is diphenyl carbonate. Volatile monohydric phenol is removed from the molten reactants by distillation and the polymer is isolated as a molten residue.

In addition to the polycarbonates, polyester-polycarbonates, and combinations of these as described above, it is also possible to use combinations of the polycarbonates and polyester-polycarbonates with other thermoplastic polymers, for example combinations of polycarbonates and/or polycarbonate copolymers with polyesters.

The polycarbonate may also comprise a polysiloxane-polycarbonate copolymer, also referred to as a polysiloxane-polycarbonate. The polysiloxane (also referred to herein as "polydiorganosiloxane") blocks of the copolymer comprise repeating siloxane units (also referred to herein as "diorganosiloxane units") of formula (8):

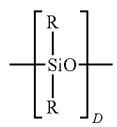

(8)

wherein each occurrence of R is same or different, and is a $C_{1-13}$ monovalent organic radical. For example, R may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group. The foregoing groups may be fully or partially halogenated with fluorine, chlorine, bromine, or iodine, or a combination thereof. Combinations of the foregoing R groups may be used in the same copolymer.

The value of D in formula (8) may vary widely depending on the type and relative amount of each component in the thermoplastic composition, the desired properties of the composition, and like considerations. Generally, D may have an average value of 2 to 1,000, specifically 2 to 500, and more specifically 5 to 100. In one embodiment, D has an average value of 10 to 75, and in still another embodiment, D has an average value of 40 to 60. Where D is of a lower value, e.g., less than 40, it may be desirable to use a relatively larger amount of the polycarbonate-polysiloxane copolymer. Conversely, where D is of a higher value, e.g., greater than 40, it may be necessary to use a relatively lower amount of the polycarbonate-polysiloxane copolymer.

A combination of a first and a second (or more) polysiloxane-polycarbonate copolymer may be used, wherein the average value of D of the first copolymer is less than the average value of D of the second copolymer.

In one embodiment, the polydiorganosiloxane blocks are provided by repeating structural units of formula (9):

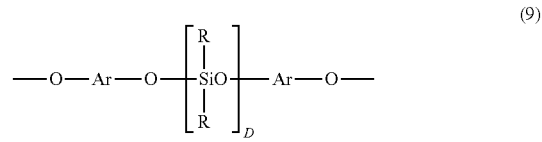

(9)

wherein D is as defined above; each R may independently be the same or different, and is as defined above; and each Ar may independently be the same or different, and is a substituted or unsubstituted $C_6$-$C_{30}$ arylene radical, wherein the bonds are directly connected to an aromatic moiety. Suitable Ar groups in formula (9) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarylene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used.

Units of formula (9) may be derived from the corresponding dihydroxy compound of formula (10):

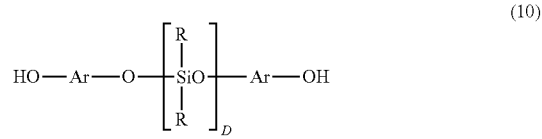

(10)

wherein R, Ar, and D are as described above. Compounds of formula (10) may be obtained by the reaction of a dihydroxyarylene compound with, for example, an alpha, omega-bisacetoxypolydiorangonosiloxane under phase transfer conditions.

In another embodiment, polydiorganosiloxane blocks comprise units of formula (11):

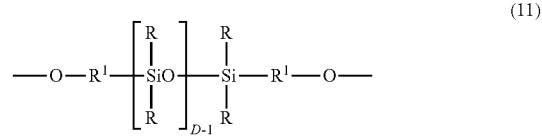

(11)

wherein R and D are as described above, and each occurrence of $R^1$ is independently a divalent $C_1$-$C_{30}$ alkylene, and wherein the polymerized polysiloxane unit is the reaction residue of its corresponding dihydroxy compound. In a specific embodiment, the polydiorganosiloxane blocks are provided by repeating structural units of formula (12):

(12)

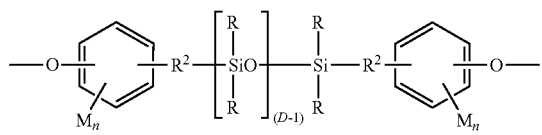

wherein R and D are as defined above. Each $R^2$ in formula (12) is independently a divalent $C_2$-$C_8$ aliphatic group. Each M in formula (12) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

Units of formula (12) may be derived from the corresponding dihydroxy polydiorganosiloxane (13):

(13)

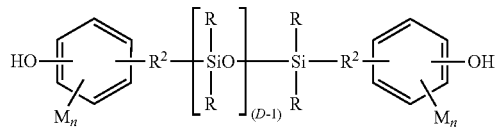

wherein R, D, M, $R^2$, and n are as described above. Such dihydroxy polysiloxanes can be made by effecting a platinum catalyzed addition between a siloxane hydride of formula (14):

(14)

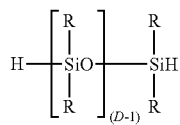

wherein R and D are as previously defined, and an aliphatically unsaturated monohydric phenol. Suitable aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The polysiloxane-polycarbonate may comprise 50 to 99 wt. % of carbonate units and 1 to 50 wt. % siloxane units. Within this range, the polysiloxane-polycarbonate copolymer may comprise 70 to 98 wt. %, specifically 75 to 97 wt. % of carbonate units and 2 to 30 wt. %, specifically 3 to 25 wt. % siloxane units.

In an embodiment, the polysiloxane-polycarbonate may comprise polysiloxane units, and carbonate units derived from bisphenol A, e.g., the dihydroxy compound of formula (3) in which each of $A^1$ and $A^2$ is p-phenylene and $Y^1$ is isopropylidene. Polysiloxane-polycarbonates may have a weight average molecular weight of 2,000 to 100,000, specifically 5,000 to 50,000 as measured by gel permeation chromatography using a crosslinked styrene-divinyl benzene column, at a sample concentration of 1 milligram per milliliter, and as calibrated with polycarbonate standards.

The polysiloxane-polycarbonate can have a melt volume flow rate, measured at 300° C./1.2 kg, of 1 to 50 cubic centimeters per 10 minutes (cc/10 min), specifically 2 to 30 cc/10 min. Mixtures of polysiloxane-polycarbonates of different flow properties may be used to achieve the overall desired flow property.

The molecular weight of the polycarbonate can vary. In one embodiment, the polycarbonate has a molecular weight ranging from 21,500 to 36,000 daltons.

The amount of the polycarbonate component varies with the specific application. Generally, the amount of the polycarbonate component is present in an amount that is at least 15 wt. %. In another embodiment, the amount of polycarbonate present in the composition ranges from 20 to 90 wt. %.

Polyesters are generally prepared by reaction of a diol with a dibasic acid or derivative. The preferred polyester components are derived from 1,4 cyclohexane dimethanol and terephthalic acid monomer units and may include copolymers modified with up to 25 mol % of copolymerizable acid and/or diol monomers. Suitable comonomers include isophthalic acid, naphthalenedicarboxylic acid, cyclohexane dicarboxylic acid, succinic acid, sebacic acid, adipic acid, ethylene glycol, diethylene glycol, butanediol, hexanediol, and neopentyl glycol.

The polyester component can have an inherent viscosity that is more than 0.5. The upper limit of the inherent viscosity of the polyester component is dependent only on the processibility of the polyester component. With very high inherent viscosities, the processibility of the polyester decreases due to difficulties in extrusion, compounding, and the like, although the inherent viscosity decreases somewhat as a result of processing. A preferred inherent viscosity range is from 0.5 to 1.0 although higher viscosity ranges are considered to be within the scope of the present invention. A particularly preferred inherent viscosity is approximately 0.77. Examples of such polyesters described above but not limited to EASTAR™ PCTG Copolyester 5445 and THERMX™ 13787 PCT; both available commercially from the Eastman Chemical Company.

The amount of the polyester component can vary, depending on the application. Generally, the polyester component is present in an amount that is at least 10 wt. %. In another embodiment, the amount of the polyester component can range from 10 to 50 wt %.

The carboxy reactive component is a polyfunctional carboxy reactive material that can be either polymeric or non-polymeric. Examples of carboxy reactive groups include epoxides, carbodiimides, orthoesters, oxazolines, oxiranes, aziridines, and anhydrides. The carboxy reactive material can also include other functionalities that are either reactive or non-reactive under the described processing conditions. Non-limiting examples of reactive moieties include reactive silicone containing materials, for example epoxy modified silicone monomers and polymeric materials. If desired, a catalyst or co-catalyst system can be used to accelerate the reaction between the polyfunctional carboxy-reactive material and other components of the composition. The term "poly" means at least two carboxy reactive groups.

Particularly useful polyfunctional carboxy reactive materials include materials with more than one reactive epoxy group. The polyfunctional epoxy compound may contain aromatic and/or aliphatic residues. Typical examples used in the art include 3,4-epoxycyclohexylmethyl-3,4-epoxycyclohexanecarboxylate, epoxy novolac resins, epoxidized vegetable (soybean, linseed) oils, styrene-acrylic copolymers containing pendant glycidyl groups and glycidyl methacrylate containing oligomers, polymers and copolymers.

Preferred materials with multiple epoxy groups are styrene-acrylic copolymers and oligomers containing glycidyl groups incorporated as side chains. Several useful examples are described in the International Patent Application WO 03/066704 A1 assigned to Johnson Polymer, LLC, incorporated herewith. These materials are based on oligomers with styrene and acrylate building blocks that have desirable glycidyl groups incorporated as side chains. A high number of epoxy groups per oligomer chain is desired, at least about 10, preferably greater than about 15, and more preferably greater than about 20. These polymeric materials generally have a molecular weight greater than about 3000, preferably greater than about 4000, and more preferably greater than about 6000. These are commercially available from Johnson Polymer, LLC under the Joncryl® trade name, preferably Joncryl®. ADR 4368 material. Other preferred materials with multiple epoxy groups are acrylic and or polyolefin copolymers and oligomers containing glycidyl groups incorporated as side chains.

Other particularly useful polyfunctional carboxy reactive materials include materials with the combination of epoxy and silane functional groups. The epoxy silane is generally any kind of epoxy silane wherein the epoxy is at one end of the molecule and attached to a cycloaliphatic group and the silane is at the other end of the molecule. A desired epoxy silane within that general description is of the following formula:

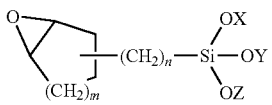

wherein m is an integer 1, 2 or 3, n is an integer of 1 through 6 and X, Y, and Z are the same or different, preferably the same and are alkyl of one to twenty carbon atoms, inclusive, cycloalkyl of four to ten carbon atoms, inclusive, alkylene phenyl wherein alkylene is one to ten carbon atoms, inclusive, and phenylene alkyl wherein alkyl is one to six carbon atoms, inclusive.

Desirable epoxy silanes within the range are compounds wherein m is 2, n is 1 or 2, desirably 2, and X, Y, and Z are the same and are alkyl of 1, 2, or 3 carbon atoms inclusive. Epoxy silanes within the range which in particular can be used are those wherein m is 2, n is 2, and X, Y, and Z are the same and are methyl or ethyl.

More particularly, in one embodiment, the additive is a multifunctional (3 or more reactive groups) agent. At least one of the groups is an epoxy. The second group, if not an epoxy, is a hydroxyl, an isocyantate, a silane, a glycidyl methacrylate modified polyolefin, and the like. Examples of such polyfunctional carboxy reactive materials are molecules such as a tri-methoxy or tri-ethoxy silane also bearing an epoxy group, for example β-(3,4-epoxycyclohexyl)ethyltriethoxysilane, sold as CoatOSil 1770 by GE. Other examples are β-(3,4-epoxycyclohexyl) ethyltrimethoxysilane, sold as Silquest A-186 by GE and 3-Glycidoxypropyltriethoxysilane, sold as Silquest Y-15589 by GE, preferred are epoxy groups in a molecule, such as in Coat-O-Sil 1770.

A further example of a preferred such polyfunctional carboxy reactive material is a LOTADER® resin, a co- or terpolymer including units of ethylene and glycidyl methacrylate (GMA), sold by Arkema.

Preferred catalysts used to accelerate the reaction between the polyfunctional carboxy-reactive material and the PET-based modified PBT component can include salts containing at least one of alkali metal compounds. It is apparent that this class contains a large number of compounds. They include alkali metal halides, alkali metal carboxylates, alkali metal enolates, amine hydrohalides, alkali metal carbonates and quaternary ammonium halides. Illustrative compounds within this class are lithium fluoride, lithium iodide, potassium bromide, potassium iodide, sodium dihydrogen phosphate, sodium acetate, sodium benzoate, sodium caproate, sodium stearate, sodium ascorbate and dodecyltrimethylammonium bromide.

In one embodiment, salts of aliphatic carboxylic acids containing at least about 18 carbon atoms, especially the alkali metal stearates and preferably sodium stearate, have certain advantages over the other catalysts employed according to the invention and are therefore often preferred. In the first place, their use permits extrusion of the polyester-epoxide composition at substantially higher feed rates than those which are effective in their absence. In the second place, they tend to suppress the formation of acrolein, a by-product from glycidyl reagents. In the third place, they impart substantially less odor to the composition than certain other compounds useful as catalysts, especially amines.

In another embodiment, a catalyst may optionally be employed. If used, the catalyst can be any of the catalysts commonly used in the prior art such as alkaline earth metal oxides such as magnesium oxides, calcium oxide, barium oxide and zinc oxide; alkali and alkaline earth metal salts; a Lewis catalyst such as tin or tinanium compounds; a nitrogen-containing compound such as tetra-alkyl ammonium hydroxides used like the phosphonium analogues, e.g., tetra-alkyl phosphonium hydroxides or acetates. The Lewis acid catalysts and the catalysts can be used simultaneously.

In another embodiment, the catalyst can be a boron component. The boron component can be boron oxide, boric acid, borate salt, or any mixtures of one or more of any of the foregoing.

More suitably, the boron component comprises boric acid, borate salt, or any mixtures of one or more of any of the foregoing. Even more preferably, the boron component comprises at least one borate salt. As used herein, "borate salt" (or simply "borate") means the salt of a boric acid. There are different boric acids, including metaboric acid ($HBO_2$), orthoboric acid ($H_3BO_3$), tetraboric acid ($H_2B_4O_7$), and pentaboric acid ($HB_5O_9$). Each of these acids can be converted to a salt by reaction with a base. Different bases can be used to make different borates. These include amino compounds which give ammonium borates, and hydrated metal oxides such as sodium hydroxide which gives sodium borates. These borates may be anhydrous, or they may be hydrated. For example, sodium tetraborate is available in the anhydrous form, and also as the pentahydrate and the decahydrate. Suitable borate salts are alkali metal borates, with sodium, lithium, and potassium being preferred, and with sodium tetraborate being especially suitable. Other suitable metal borates are divalent metal borates, with alkaline earth metal borates being preferred, in particular calcium and magnesium. Trivalent metal borates, such as aluminum borate, may also be used.

As such, inorganic compounds such as the hydroxides, hydrides, amides, carbonates, borates, etc., of alkali metals such as sodium, potassium, lithium, cesium, etc., and of alkali earth metals such as calcium, magnesium, barium, etc., can be cited such as examples of alkali or alkaline earth metal compounds. Examples include sodium stearate, sodium carbonate, sodium acetate, sodium bicarbonate, sodium benzoate, sodium caproate, or potassium oleate.

In one embodiment of the invention, the catalyst is selected from one of phosphonium salts or ammonium salts (not being based on any metal ion) for improved hydrolytic stability properties. In another embodiment of the invention, the catalyst is selected from one of: a sodium stearate, a sodium benzoate, a sodium acetate, and a tetrabutyl phosphonium acetate. In yet another embodiment of the present invention the catalysts is selected independently from a group of sodium stearate, zinc stearate, calcium stearate, magnesium stearate, sodium acetate, calcium acetate, zinc acetate, magnesium acetate, manganese acetate, lanthanum acetate, lanthanum acetylacetonate, sodium benzoate, sodium tetraphenyl borate, dibutyl tinoxide, antimony trioxide, sodium polystyrenesulfonate, PBT-ionomer, titanium isoproxide and tetraammoniumhydrogensulfate and mixtures thereof.

In one embodiment, the polyfunctional carboxy reactive material includes at least one epoxy-functional polymer. The epoxy polymer is an epoxy functional (alkyl)acrylic monomer and at least one non-functional styrenic and/or (alkyl) acrylic and or olefin monomer. In one embodiment of the present invention the epoxy polymer has at least one epoxy-functional (meth)acrylic monomer and at least one non-functional styrenic and/or (meth)acrylic monomer. These polyfunctional carboxy reactive material are characterized by relatively low molecular weights. In another embodiment the polyfunctional carboxy reactive material are epoxy-functional styrene (meth)acrylic copolymers produced from monomers of at least one epoxy functional (meth)acrylic monomer and at least one non-functional styrenic and/or (meth)acrylic monomer. As used herein, the term (meth) acrylic includes both acrylic and methacrylic monomers. Non limiting examples of epoxy-functional (meth)acrylic monomers include both acrylates and methacrylates. Examples of these monomers include, but are not limited to, those containing 1,2-epoxy groups such as glycidyl acrylate and glycidyl methacrylate. Other suitable epoxy-functional monomers include allyl glycidyl ethacrylate, and glycidyl itoconate.

Suitable acrylate and methacrylate monomers include, but are not limited to, methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate. Styrenic monomers for use in the present invention include, but are not limited to, styrene, alpha-methyl styrene, vinyl toluene, p-methyl styrene, t-butyl styrene, o-chlorostyrene, and mixtures of these species. In certain embodiments the styrenic monomers for use in the present invention are styrene and alpha-methyl styrene.

In another embodiment, the polyfunctional carboxy reactive material includes at least one difunctional epoxy compound. By difunctional epoxy compound is meant a compound having two terminal epoxy functionalities. Preferably the compound will contain only carbon, hydrogen and oxygen. The compound will preferably have a molecular weight of below about 1000, to facilitate blending with the polyester resin. Preferred difunctional epoxy compounds will have at least one of the epoxide groups on a cyclohexane ring. Examples of preferred difunctional epoxy compounds are 3,4-epoxycyclohexyl-3,4-epoxycyclohexyl carboxylate, bis (3,4-epoxycyclohexylmethyl) adipate, vinylcyclohexene diepoxide, bisphenol diglycidyl ethers, diglycidyl adducts of amines and amides, diglycidyl adducts of carboxylic acids and the like. Especially preferred is 3,4-epoxycyclohexyl-3,4 epoxycyclohexylcarboxylate.

The difunctional epoxide compounds can be made by techniques well known to those skilled in the art. For example, the corresponding α or β-dihydroxy compounds can be dehydrated to produce the epoxide groups, or the correspondingly unsaturated compounds can be epoxidized by treatment with a peracid, such as peracetic acid, in well-known techniques. The compounds are also commercially available.

In another embodiment, the carboxy reactive material is an epoxy functional (alkyl)acrylic monomer and at least one non-functional styrenic and/or (alkyl)acrylic monomer. In one embodiment, the epoxy polymer has at least one epoxy-functional (meth)acrylic monomer and at least one non-functional styrenic and/or (meth)acrylic monomer which are characterized by relatively low molecular weights. In another embodiment the epoxy functional polymer may be epoxy-functional styrene (meth)acrylic copolymers produced from monomers of at least one epoxy functional (meth)acrylic monomer and at least one non-functional styrenic and/or (meth)acrylic monomer. As used herein, the term (meth) acrylic includes both acrylic and methacrylic monomers. Non limiting examples of epoxy-functional (meth)acrylic monomers include both acrylates and methacrylates. Examples of these monomers include, but are not limited to, those containing 1,2-epoxy groups such as glycidyl acrylate and glycidyl methacrylate. Other suitable epoxy-functional monomers include allyl glycidyl ether, glycidyl ethacrylate, and glycidyl itoconate.

Specifically, the epoxies that can be employed herein include glycidol, bisphenol-A diglycidyl ether, tetrabromobisphenol-A diglycidyl ether, diglycidyl ester of phthalic acid, diglycidyl ester of hexahydrophthalic acid, epoxidized soybean oil, butadiene diepoxide, tetraphenylethylene epoxide, dicyclopentadiene dioxide, vinylcyclohexene dioxide, bis(3,4-epoxy-6-methylcyclohexylmethyl)adipate, and 3,4-epoxycyclohexylmethyl-3,4-epoxycyclohexane carboxylate.

Epoxy functionalized materials are available from Dow Chemical Company under the tradename DER-332, from Resolution Performance Products under the trade name EPON Resin 1001F, 1004F, 1005F, 1007F, and 1009F; from Shell Oil Corporation under the tradenames Epon 826, 828, and 871; from Ciba-Giegy Corporation under the tradenames CY-182 and CY-183; and from DOW under the tradename ERL-4221 and ERL-4299. Johnson Polymer Co is a supplier of and epoxy functionalized material known as ADR4368 and 4300.

The amount of the compatibilizing carboxy reactive component is generally at least 0.01 wt. %. In one embodiment, the amount of the polyfunctional carboxy reactive component ranges from 0.01 to 0.5 wt %.

In one embodiment of the present invention the thermoplastic resin composition includes a quencher component. Quenchers are agents inhibit activity of any catalysts that may be present in the resins to prevent an accelerated interpolymerization and degradation of the thermoplastic. The suitability of a particular compound for use as a stabilizer and the determination of how much is to be used as a stabilizer may be readily determined by preparing a mixture of the polyester resin component and the polycarbonate and determining the effect on melt viscosity, gas generation or color stability or the formation of interpolymer.

A preferred class of quenchers is those which provide a transparent/translucent and colorless product. Quenchers can include materials that are sometimes used as stabilizers. Such suitable quenchers include can be selected from the group consisting of acidic phosphate salts, acid phosphites, alkyl phosphites, aryl phosphites, mixed phosphites and combinations thereof. More particularly, favored quenchers can include an effective amount of an acidic phosphate salt; an acid phosphites, alkyl phosphites, aryl phosphites or mixed phosphites having at least one acidic hydrogen; a Group IB or Group IIB metal phosphate salt; a phosphorus oxo acid, a metal acid pyrophosphate or a mixture thereof. The suitability of a particular compound for use as a quencher and the determination of how much is to be used as a quencher may be readily determined by preparing a mixture of the polyester resin component and the polycarbonate and determining the effect on melt viscosity, gas generation or color stability or the formation of interpolymer. The acidic phosphate salts include sodium dihydrogen phosphate, mono zinc phosphate, potassium hydrogen phosphate, calcium dihydrogen phosphate and the like. The phosphites may be of the formula (IX):

(IX)

where R1, R2 and R3 are independently selected from the group consisting of hydrogen, alkyl and aryl with the proviso that at least one of $R_1$, $R_2$ and $R_3$ is hydrogen.

The phosphate salts of a Group IB or Group IIB metal include zinc phosphate and the like. The phosphorus oxo acids include phosphorous acid, phosphoric acid, polyphosphoric acid or hypophosphorous acid.

The polyacid pyrophosphates may be of the formula X:

(X)

wherein M is a metal, x is a number ranging from 1 to 12 and y is a number ranging from 1 to 12, n is a number from 2 to 10, z is a number from 1 to 5 and the sum of (xz)+y is equal to n+2. The preferred M is an alkaline or alkaline earth metal.

The most preferred quenchers are oxo acids of phosphorus or acidic organo-phosphorus compounds. Inorganic acidic phosphorus compounds may also be used as quenchers, however they may result in haze or loss of clarity. Most preferred quenchers are phosphoric acid, phosphorous acid or their partial esters such as mono zinc phosphate.

Typically, the quencher is used at a level of about 0.001 to about 10 wt. %, and preferably at a level of about 0.005 to about 2 wt. %, based on the total weight of the composition.

Advantageously, the invention provides a molding composition that imparts desirable properties to molded articles that are ordinarily used in environments that have high heat, humidity, and harsh chemicals such as detergents, bleaches, and the like. The molding composition is particularly useful for making products in the housewares markets in applications such as food containers, measuring cups, washing machine internal components, and the like.

A composition can also include an additive selected from the group consisting of stabilizers, mold release agents, ultraviolet absorbers, and combinations thereof. A molding composition of the invention may further contain a heat stabilizer. Suitable heat stabilizers include, but are not limited to, phenol stabilizers, organic thioether stabilizers, organic phosphide stabilizers, hindered amine stabilizers, epoxy stabilizers and mixtures thereof. The heat-resistant stabilizer may be added in the form of a solid or liquid.

The amount of the heat stabilizer that can be in the molding composition is generally at least 0.01 wt. %. In one embodiment, a combination of heat stabilizers is used. A hindered phenol is used in combination with a phosphonous acid. The preferred amount of the hindered phenol is from 0.01 wt. % to 1 wt. %. The preferred amount of the phosphonous acid used in combination with hindered phenol is 0.01 wt. % to 1 wt. %. %. In one of the preferred embodiment, the amount of the hindered phenol stabilizer is between 0.01 wt. % and 0.25 wt. % and the amount of phosphonous acid is between 0.01 wt. % and 0.25 wt. %.

A molding composition of the invention may further contain a ultraviolet stabilizer. Suitable ultraviolet stabilizers generally include a wide variety of ultraviolet absorbers. Examples of ultraviolet absorbers include, but are not limited to, salicylic acid ultraviolet absorbers, benzophenone ultraviolet absorbers, benzotriazole ultraviolet absorbers, cyanoacrylate ultraviolet absorbers and mixtures thereof.

The amount of the ultraviolet stabilizer that can be in the molding composition is generally at least 0.01 wt %. Preferred amount of the ultraviolet stabilizer ranges from 0.01 to 2 wt. %. In one embodiment, the amount of the ultraviolet stabilizer ranges from 0.01 to 0.5 wt. %.

In another embodiment, the molding composition can further include mold-release agents. Examples of the mold-release agents include, but are not limited to natural and synthetic paraffins, polyethylene waxes, fluorocarbons, and other hydrocarbon mold-release agents; stearic acid, hydroxystearic acid, and other higher fatty acids, hydroxyfatty acids, and other fatty acid mold-release agents; stearic acid amide, ethylenebisstearamide, and other fatty acid amides, alkylenebisfatty acid amides, and other fatty acid amide mold-release agents; stearyl alcohol, cetyl alcohol, and other aliphatic alcohols, polyhydric alcohols, polyglycols, polyglycerols and other alcoholic mold release agents; butyl stearate, pentaerythritol tetrastearate, and other lower alcohol esters of fatty acid, polyhydric alcohol esters of fatty acid, polyglycol esters of fatty acid, and other fatty acid ester mold release agents; silicone oil and other silicone mold release agents, and mixtures of any of the aforementioned. The mold release agent can be used in conjunction with other additives, e.g., teflon styrene acrylonitrile The amount of the mold release agent can be in the molding composition is generally at least 0.05 wt. %. Preferred amount of the mold release agent ranges from 0.1 to 2 wt. %. In another embodiment, the amount of the mold release agent ranges from 0.2 to 0.6 wt. %.

In use, the invention provides an effective solution for applications that require plastic products that will be exposed to extreme conditions. The caustic aqueous environment at which the compositions an articles retain their structural integrity and transparency properties can vary. The temperature, for instance, at which articles are exposed to while retaining transparency and structural integrity can vary. In one embodiment, the temperature at which the article is exposed to ranges from 70° C., or more than 85° C. to 90° C. In another embodiment, the temperature is more than 85 C. The humidity at which the article is exposed to can range from 80%, or 85%, or more than 95% to 100%. The transparency that an article made from the composition can also vary. In one embodiment, the transmission is more than 85%. In one embodiment, the composition and articles made from the composition can retain their structural integrity and transparency properties even after an article/composition is exposed to extreme conditions for 405 hours. The pH of the environment can also vary. In one embodiment, the pH ranges from 7 to 13. The articles from which compositions of the invention can be made can vary. For instance, suitable articles include bowls, and lamp housings. Such bowls can have a base diameter ranging from 1 cm to 50 cm.

The invention is further described in the following illustrative examples in which all parts and percentages are by weight unless otherwise indicated.

EXAMPLES

Procedures
Dishwasher Cycle Test Set-up:
Tests were performed in an industrial fully programmable Miele dishwasher. The dishwasher program used for these tests is the most severe household program Miele has available in their household dishwashers. Samples were positioned randomly in the dishwasher. The detergent used is Topmatic 2000 from Henkel/Ecolab (contains chlorine, pH 12.5; 1% solution). Rinse additive used is Clear Dry Classic (pH 6.25 pure), also from Henkel/Ecolab. Dishwashing program is explained below:
1) Pre-rinsing with cold water
2) Adding detergent (0.3%, T>10° C.)
3) Cleaning at 85° C.
4) Rinsing with cold water
5) Adding rinse additive (0.03%, T>30° C.)
6) Rinsing at 65° C.
7) Drying at 80° C.
8) Cooling down
Test Parts:
The test parts used for this study are of two kinds. For the simulated dishwasher testing; a cuboidal shaped food bowl with dimensions of 13 cm×12 cm×8 cm was used. For testing material under strain regular dog shaped ASTM type I tensile bars are used.
Performance Assessment:
For the simulated dishwasher testing; visual assessment after "X" number of cycles was used. "X" could be 50; 80; 100 or 160 cycles. The exact number of cycles after which the assessment was made is reported in the results table. For testing material under strain the tensile bars are evaluated visually and also by the percent retention in elongation at break as measured by the ASTM D638 method.
Extrusion Conditions:
The material was either obtained directly from commercial sources such as LEXAN® 141R or were extruded in house by the following method. The ingredients were tumble-blended and then extruded on a compounding line which is a 27 mm Werner Pfleiderer Twin Screw Extruder with a vacuum vented co-rotating mixing screws. The temperature was set at 520 F (271° C.) and screw speed at 300 rpm. The normal output rate on this line is 50 lbs/hr. The extrudate was cooled through a water bath prior to pelletizing.
Molding Conditions:
ASTM type 1 tensile bars were injection molded on a Van Dorn molding machine (80T) with a set temperature recommended on supplier datasheet and approximately 560 F (293° C.) for invention blends. The pellets were dried for 3-4 hours at 170 F (77° C.) in a forced air-circulating oven prior to injection molding. The boxes for the simulated dishwasher study were molded on a 220 Ton TOYO with an intensification ratio of 10:1.
Transparency Measurements:
Transparency is measured using Gretag Macbeth Spectrophotometer. The test method used is ASTM D 1003. The measurements are done on a 100 mil plaque. The measurements are done in transmission mode.

EXAMPLES

Example 1-9

Evaluation of different plastics used for the Housewares market after they have been exposed to a number of repeat dishwasher cycles. Visual assessment of the different bowls were carried out to check for imperfections like micro-crazes, cracks, haze etc.
Materials:
Table A below points out the chemical description of materials used in the examples.

TABLE A

| Component | Description | Trade name, Source |
|---|---|---|
| PC high flow | Bisphenol-based polycarbonate resin (Mw = 22,000 g/mol, PS standards) | LEXAN ®, GE Plastics |
| PC 100 grade | Bisphenol-based polycarbonate resin (Mw = 30,000 g/mol, PS standards) | LEXAN ®, GE Plastics |
| PC 131 | Bisphenol-based polycarbonate resin (Mw = 36,000 g/mol, PS standards) | LEXAN ®, GE Plastics |
| PCT 13787 | Poly(1,4-cyclohexanedimethylene terephthalate) (Mw = 70,000 g/mol, PS standards) | Eastman Chemical |
| ITR-20 PC | Poly(20 mol % isophthalate-terephthalate-resorcinol ester)-co-(80 mol % bisphenol-A carbonate) copolymer (Mw = 25,000 g/mol, PS standards) | GE Plastics |
| Pentaerythritol tetrastearate | Pentaerythritol tetrastearate | Lonza, Inc. |
| PEP-Q | Tetrakis(2,4-di-tert-butylphenyl)-4,4'-biphenylene diphosphonite | Sandostab P-EPQ, Clariant |
| AO1010 | Pentaerythritol tetrakis(3,5-di-tert-butyl-4- | Irganox 1010, Ciba Specialty |

TABLE A-continued

| Component | Description | Trade name, Source |
|---|---|---|
| | hydroxyhydrocinnamate) | Chemicals |
| UV5411 | 2-(2'-Hydroxy-5'-octylphenyl)-benzotriazole | Cyasorb UV-5411, Cytec Indus. |
| Phosphoric Acid, pre-diluted to 10% | Phosphoric Acid, pre-diluted to 10% | Lab Chem, Inc. |
| ADR4368 | Styrene-acrylate copolymer with glycidyl groups | BASF |
| PCTG | Poly(ethylene terephthalate)-co-(1,4-cyclohexanedimethylene terephthalate) (20 mol % ethylene units and 80 mol % 1,4-cyclohexanedimethylene units (Mw = 70,000 using polystyrene standards) | Eastman Chemical Co. |
| Transparent EXL-PC | PC-siloxane copolymer | GE Plastics |
| Branched PC | Branched Polycarbonate Lexan ® Resin, Mn by GPC against polystyrene standards is 37 kg/mol | GE Plastics |
| Selar 3426 | Amorphous polyamide resin | DuPont |

The following is short description of the materials that were evaluated in the respective examples mentioned; detailed formulations are presented in Table 1:

Example 1:—"PC (polycarbaonte)-PCT (polycyclohexane terephathalate) blend"
Comparative Example 2:—"PC (polycarbonate)-PCTG (random copolymer of polyethylene terephathalate and polycylohexane terephathalate) Blend"
Comparative Example 3:—"PC 131(polycarbonate)-PCTG (random copolymer of polyethylene terephathalate and polycylohexane terephathalate) Blend"
Comparative Example 4:—"Branched PC (polycarbonate)-PCTG (random copolymer of polyethylene terephathalate and polycylohexane terephathalate)"
Comparative Example 5:—"TR-20 (poly[(isophthalate-terephthalate-resorcinol) ester-co-(isophthalate-terephthalate-bisphenol-A)]ester)"
Comparative Example 6:—"PC (polycarbonate)-PCTG (random copolymer of polyethylene terephathalate and polycylohexane terephathalate) Blend"
Comparative Example 7:—"PC (polycarbonate)-PCTG (random copolymer of polyethylene terephathalate and polycylohexane terephathalate) Blend"
Comparative Example 8:—"ITR-20 (poly[(isophthalate-terephthalate-resorcinol) ester-co-(isophthalate-terephthalate-bisphenol-A)]ester)"-SELAR® blend"
Comparative Example 9:—"LEXAN® 141R" (Polycarbonate obtained directly from commercial source)

TABLE 1

Formulations of tested in Example 1–8

| | Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| PC high flow | 24.03 | 62.30 | 0.00 | 0.00 | 0.00 | 36.00 | 62.00 | 0.00 |
| PC 100 grade | 0.00 | 11.00 | 0.00 | 0.00 | 0.00 | 43.30 | 11.00 | 0.00 |
| PC, 131 | 50.00 | 0.00 | 74.49 | 0.00 | 0.00 | 0.00 | 0.00 | 0.00 |
| Branched PC | 0.00 | 0.00 | 0.00 | 63.75 | 0.00 | 0.00 | 0.00 | 0.00 |
| ITR-20 PC | 0.00 | 0.00 | 0.00 | 0.00 | 99.94 | 0.00 | 0.00 | 89.42 |
| SELAR 3426 | 0.00 | 0.00 | 0.00 | 0.00 | 0.00 | 0.00 | 0.00 | 9.94 |
| PCT 13787 | 24.88 | 0 | 0 | 0 | 0.00 | 0.00 | 0.00 | 0.00 |
| PCTG | 0.00 | 26.30 | 25.00 | 36.00 | 0.00 | 20.00 | 26.30 | 0.00 |
| Pentaerythritol tetrastearate | 0.3 | 0.3 | 0.3 | 0.2 | 0.0 | 0.3 | 0.3 | 0.0 |
| PEP-Q | 0.1 | 0.1 | 0.1 | 0.1 | 0.1 | 0.1 | 0.1 | 0.2 |
| AO1010 | 0.12 | 0.00 | 0.12 | 0.00 | 0.00 | 0.00 | 0.00 | 0.20 |
| Phosphoric Acid pre-diluted to 10% | 0.075 | 0.05 | 0.05 | 0.05 | 0.000 | 0.050 | 0.050 | 0.00 |
| ADR4368 | 0.25 | 0.25 | 0.25 | 0.25 | 0.00 | 0.25 | 0.25 | 0.25 |
| UV5411 | 0.25 | 0 | 0 | 0 | 0.00 | 0 | 0 | 0.00 |
| Total | 100 | 100 | 100 | 100 | 100 | 100 | 100 | 100 |

Table 2 shows that our invention sample; example 1 is best performance in terms of both haziness appearance as well as cracks or craze appearance after 600 cycles. As similar formula in PCTG based material (such as example comparative sample 2) are failing at 300 cycle check.

TABLE 2

Visual observations on various blends after every 100 cycles in simulated dishwasher testing. (Cracks:- + = some; ++ = more; +++ = severe; ++++ = Extreme)

| Material | Cycles | BOX 1; TOP rack | | BOX 2; BOTTOM rack | |
|---|---|---|---|---|---|
| | | Hazy | Crack/Crazes/etc | Hazy | Crack/Crazes/etc |
| Example 1 | 100 | ok | ok | ok | ok |
| | 200 | ok | ok | ok | ok |
| | 300 | ok | ok | ok | ok |
| | 400 | ok | ok | ok | ok |
| | 500 | ok | ok | ok | ok |
| | 600 | ok | ok | ok | ok |
| Comparative Example 2 | 100 | ok | ok | ok | ok |
| | 200 | ok | ok | ok | ok |
| | 300 | + | ok | + | ok |
| | 400 | + | ok | + | ok |
| | 500 | + | ok | + | some cracks + broken piece |
| | 600 | ++ | some microcracks | ++ | severe cracks + microcracks + broken piece |
| Comparative Example 3 | 100 | ok | ok | ok | ok |
| | 200 | ok | ok | ok | ok |
| | 300 | + | ok | + | ok |
| | 400 | + | ok | + | one crack |
| | 500 | + | ok | + | one crack |
| | 600 | ++ | some microcracks | ++ | one crack + some microcracks |
| Comparative Example 4 | 100 | ok | ok | ok | ok |
| | 200 | ok | ok | ok | ok |
| | 300 | ok | ok | ok | ok |
| | 400 | ok | ok | ok | warpage and one crack |
| | 500 | + | ok | ok | warpage and one crack |
| | 600 | + | some discoloration | + | warpage + one crack + some discoloration |
| Comparative Example 5 | 100 | ok | ok | ok | ok |
| | 200 | ok | ok | ok | ok |
| | 300 | + | ok | + | ok |
| | 400 | + | crazes at the injection point | + | crazes at the injection point |
| | 500 | ++ | crazes at the injection point + more crazing | ++ | crazes at the injection point + more crazing |
| | 600 | +++ | crazes at the injection point + more crazing | +++ | crazes at the injection point + more crazing |
| Comparative Example 6 | 100 | ok | ok | ok | ok |
| | 200 | + | ok | + | ok |
| | 300 | + | ok | + | ok |
| | 400 | + | ok | + | ok |
| | 500 | + | microcracks | + | microcracks |
| | 600 | ++ | microcracks | + | microcracks |
| Comparative Example 7 | 100 | ok | ok | ok | ok |
| | 200 | ok | ok | ok | ok |
| | 300 | + | ok | + | ok |
| | 400 | + | ok | + | ok |
| | 500 | + | microcracks | + | microcracks |
| | 600 | ++ | microcracks | ++ | microcracks |
| Comparative Example 8 | 100 | ok | ok | ok | ok |
| | 200 | + | ok | + | ok |
| | 300 | ++ | ok | ++ | ok |
| | 400 | +++ | ok | +++ | ok |
| | 500 | ++++ | ok | ++++ | ok |
| | 600 | ++++ | some cracks | ++++ | some cracks |
| Comparative Example 9 | 100 | ok | ok | ok | ok |
| | 200 | ok | ok | ok | ok |
| | 300 | + | one crack | + | ok |
| | 400 | +++ | one crack + microcracks | +++ | microcracks |
| | 500 | +++ | some cracks + microcracks | +++ | broken piece + mikrocracks |

Example 10-18

In this example, the same exact conditions of dishwasher cycle were used as reported in Example 1, except that the parts used for the test were test specimens i.e. tensile bars under 1% strain.

TABLE 3

Formulations of tested in Example 10–17. Comparative Example 18 is EXL1433 obtained from commercial source.

| | Example 10 | Example 11 | Example 12 | Example 13 | Example 14 | Example 15 | Comparative Example 16 | Comparative Example 17 |
|---|---|---|---|---|---|---|---|---|
| PC high flow | 24.03 | 24.03 | 24.03 | 50.00 | 19.02 | 14.02 | 0.00 | 62.00 |
| PC 100 grade | 0.00 | 0.00 | 50.00 | 24.03 | 0.00 | 0.00 | 0.00 | 11.00 |
| PC, 131 | 50.00 | 50.25 | 0.00 | 0.00 | 40.00 | 30.00 | 74.49 | 0.00 |
| Transparent EXL-PC | 0.00 | 0.00 | 0.00 | 0.00 | 15.00 | 30.00 | 0.00 | 0.00 |
| PCT 13787 | 24.88 | 24.88 | 24.88 | 24.88 | 24.88 | 24.88 | 0 | 0.00 |
| PCTG | 0.00 | 0.00 | 0.00 | 0.00 | 0.00 | 0.00 | 25.00 | 26.30 |
| Pentaerythritol tetrastearate | 0.3 | 0.3 | 0.3 | 0.3 | 0.3 | 0.3 | 0.3 | 0.3 |
| PEP-Q | 0.1 | 0.1 | 0.1 | 0.1 | 0.1 | 0.1 | 0.1 | 0.1 |
| AO1010 | 0.12 | 0.12 | 0.12 | 0.12 | 0.12 | 0.12 | 0.12 | 0.00 |
| Phosphoric Acid pre-diluted to 10% | 0.075 | 0.075 | 0.075 | 0.075 | 0.075 | 0.075 | 0.05 | 0.050 |
| ADR4368 | 0.25 | 0.00 | 0.25 | 0.25 | 0.25 | 0.25 | 0.25 | 0.25 |
| UV5411 | 0.25 | 0.25 | 0.25 | 0.25 | 0.25 | 0.25 | 0 | 0 |
| Total | 100.0 | 100.0 | 100.0 | 100.0 | 100.0 | 100.0 | 100.0 | 100.0 |

TABLE 4

Visual observations on various blends after 50; 80 and 160 cycles in simulated dishwasher testing. Test specimen is ASTM tensile bars under 1% strain.

| | Example 10 | Example 11 | Example 12 | Example 13 | Example 14 | Example 15 | Comparative Example 16 | Comparative Example 17 | Comparative Example 18 |
|---|---|---|---|---|---|---|---|---|---|
| 50 cycles | ok | ok | ok | ok | ok | ok | ok | ok | ok |
| 50 cycles (repeat) | ok | ok | ok | ok | ok | ok | ok | ok | ok |
| 80 cycles | ok | ok | ok | ok | ok | ok | 3/5 some crazes | 3/5 some crazes | 5/5 some crazes |
| 80 cycles (repeat) | ok | ok | ok | ok | ok | ok | 5/5 some crazes | 3/5 some crazes | 5/5 some crazes |
| 160 | ok | ok | ok | ok | ok | ok | 5/5 some crazes | 4/5 some crazes | 5/5 some crazes |
| 160 cycles (repeat) | ok | ok | ok | ok | ok | ok | 5/5 some crazes | 5/5 some crazes | 5/5 some crazes |

Example 19-23

In this example chemical resistance against Cascade dishwashing liquid was evaluated for various blends. The formulations used here are all commercial materials except the invention blend, sample 5. Formulation for this blend was reported in Table 1. The test specimens were ASTM tensile bars molded under manufacturer's recommended injection molding processing profiles. Tensile bars were subjected to 0.5 and 1% strain.

TABLE 5

Percent retention in elongation at break after exposure to cascade solution at specified temp and strain Percent Retention in Elongation at Break

| | One day Exposure | | | | Three day Exposure | | | |
|---|---|---|---|---|---|---|---|---|
| | 70 C. | | 85 C. | | 70 C. | | 85 C. | |
| | \multicolumn{8}{c}{Strain} | | | | | | | |
| | 0.50% | 1% | 0.50% | 1% | 0.50% | 1% | 0.50% | 1% |
| Example 1 | 112 | 102 | 95 | 25 | 83 | 68 | 29 | 23 |
| Comparative Example 19 | 49 | Breaks | 11 | Breaks | 19 | Breaks | 9 | Breaks |
| Comparative Example 20 | 112 | Breaks | 16 | Breaks | 64 | Breaks | 12 | Breaks |
| Comparative Example 21 | 108 | 96 | 23 | 15 | 42 | 21 | 12 | 13 |
| Comparative Example 22 | 112 | 96 | 62 | 41 | 67 | 34 | 32 | 22 |
| Comparative Example 23 | 98 | Breaks | 61 | Breaks | 71 | Breaks | 20 | Breaks |

TABLE 5-continued

Percent retention in elongation at break after exposure to cascade solution at specified temp and strain
Percent Retention in Elongation at Break

| | One day Exposure | | | | Three day Exposure | | | |
|---|---|---|---|---|---|---|---|---|
| | 70 C. | | 85 C. | | 70 C. | | 85 C. | |
| | | | | Strain | | | | |
| | 0.50% | 1% | 0.50% | 1% | 0.50% | 1% | 0.50% | 1% |

Cascade Solution is 15 mL/L
Fail <50
Borderline 50–80
Pass 80–120

Comparative Examples 19 through 23 are commercial materials listed below:—
Comparative Example 19:—LEXAN® 124R
Comparative Example 20:—LEXAN® 141R
Comparative Example 21:—LEXAN® EXL 1414T
Comparative Example 22:—LEXAN® EXL 1443
Comparative Example 23:—XYLEX® X7509

Table 5 clearly shows that our invention blend retains its mechanical integrity after one day exposure at 70 C at 1% strain; whereas LEXAN 124R; LEXAN 141 and XYLEX X7509 break and loose their mechanical integrity. LEXAN EXL1414T and LEXAN EXL1443 both have lower performance than the invention blend after three day exposure at 1% strain and 70 C.

Example 24-26

In this example, chemical resistance against Cascade dishwashing liquid was evaluated for various blends having different PCT level. The test specimens were ASTM tensile bars. Tensile bars were subjected to 1% strain.

TABLE 6

Formulations of tested in Example 24–26

| Formulation ->% | Example 24 | Example 25 | Example 26 |
|---|---|---|---|
| PC, 131 | 56.66 | 50 | 37.33 |
| PCT, 13787 | 15 | 25 | 44 |
| PC high flow | 27.245 | 23.905 | 17.575 |
| Pentaerythritol tetrasteate | 0.3 | 0.3 | 0.3 |
| ADR4368 | 0.25 | 0.25 | 0.25 |
| 10% dil Phosphoric acid | 0.075 | 0.075 | 0.075 |
| PEPQ | 0.1 | 0.1 | 0.1 |
| Anti-oxidant 1010 | 0.12 | 0.12 | 0.12 |
| UV5411 | 0.25 | 0.25 | 0.25 |
| Sum | 100 | 100 | 100 |

TABLE 7

Percent Retention in Elongation at Break @ 2 day exposure/1% strain

| | Example 24 | Example 25 | Example 26 |
|---|---|---|---|
| % Retention in elongation @ break | 85 | 84 | 86 |

Fail <50
Borderline 50–80
Pass 80–120

Although the present invention has been described in detail with reference to certain preferred versions thereof, other variations are possible. Therefore, the spirit and scope of the appended claims should not be limited to the description of the versions contained therein.

What is claimed is:

1. A composition comprising a clear thermoplastic blend comprising:
    (a) from 15 to 40 wt % of a first polycarbonate component having a weight average molecular weight ranging from 18,000 to 25,000 grams/mole, as measured by Gel Permeation Chromatography GPC using polystyrene standards;
    (b) from 5 to 55 wt % of a second polycarbonate component having a weight average molecular weight ranging from 32,000 to 40,000 grams/mole, as measured by Gel Permeation Chromatography GPC using polystyrene standards;
    (c) from 15 to 35 wt %, based on the total weight of the composition, of a polyester component that is poly(1,4-cyclohexanedimethylene terephthalate);
    (d) from 0.01 to 0.5 wt % of a compatibilizing carboxy reactive component consisting of an epoxy polymer comprising at least one epoxy-functional (meth)acrylic monomer and at least one-non-functional styrenic and (meth)acrylic monomer;
    wherein the polycarbonate component and the polyester component are present in sufficient proportions to form a molding composition capable of being molded into an article that exhibits transparency and structural integrity after the article is exposed to a caustic aqueous environment for at least 70 hours, wherein the temperature ranges from 70° C. to 90° C.

2. The composition of claim 1, wherein the polyester component is present in an amount ranging from about 24.88 to 35 wt %.

3. The composition of claim 1, wherein the temperature is more than 85° C., and the article capable of being molded from the composition exhibits transparency and structural integrity after the article is exposed to a caustic aqueous environment for at least 70 hours.

4. The composition of claim 1, wherein the humidity is more than 95%.

5. The composition of claim 1, wherein the time is 405 hours.

6. The composition of claim 1, wherein the pH ranges from 7 to 13.

7. The composition of claim 1, wherein the composition further comprises a quencher component.

8. The composition of claim 7, wherein the quencher component is present in an amount ranging from 0.001 to 10 wt %.

9. The composition of claim 7, wherein the quencher component is selected from the group consisting of acidic phosphate salts, acid phosphites, alkyl phosphites, aryl phosphites, mixed phosphites and combinations thereof.

10. The composition of claim 1, wherein the composition further comprises a carboxy reactive material.

11. The composition of claim 1, wherein the composition further comprises an additive selected from the group consisting of stabilizers, mold release agents, ultraviolet absorbers, and combinations thereof.

12. An article comprising the composition of claim 1, wherein the article is a dishwasher part or bowl.

13. The article of claim 12, wherein the article is a bowl.

14. The article of claim 13, wherein the bowl has a base diameter ranging from 1 cm to 50 cm.

15. An article made from a composition comprising a clear thermoplastic blend comprising:
(a) from 20 to 90 wt % of a polycarbonate component including:
(i) from 15 to 40 wt % of a first polycarbonate component having a weight average molecular weight ranging from 18,000 to 25,000 grams/mole, as measured by Gel Permeation Chromatography GPC using polystyrene standards;
(ii) from 5 to 55 wt % of a second polycarbonate component having a weight average molecular weight ranging from 32,000 to 40,000 grams/mole, measured by Gel Permeation Chromatography GPC using polystyrene standards;
(b) from 15 to 35 wt %, based on the total weight of the composition, of poly(1,4-cyclohexanedimethylene terephthalate);
(d) from 0.01 to 0.5 wt % of a compatibilizing carboxy reactive component consisting of an epoxy polymer comprising at least one epoxy-functional (meth)acrylic monomer and at least one-non-functional styrenic and (meth)acrylic monomer; and
(c) from 0.001 to 10 wt % of a quencher component; wherein the wt % sum of (a), (b), and (c) is 100 wt % and wherein the article is a dishwasher part or bowl.

16. An article comprising the composition of claim 15, wherein the article is selected from the group consisting of bowls having base diameters ranging from 1 cm to 50 cm and lamp housings.

17. A composition comprising a clear thermoplastic blend comprising:
(a) from 15 to 40 wt % of a first polycarbonate component having a weight average molecular weight ranging from 18,000 to 25,000 gram/mole, as measured by Gel Permeation Chromatography GPC using polystyrene standards;
(b) from 5 to 55 wt % of a second polycarbonate component having a weight average molecular weight ranging from 32,000 to 40,000 grams/mole, as measured by Gel Permeation Chromatography GPC using polystyrene standards;
(c) from about 24.88 to 35 wt. %, based on the total weight of the composition, of poly(1,4- cyclohexanedimethylene terephthalate);
(d) from 0 to 0.5 wt % of a mold release selected from the group consisting of stearic acid, hydroxystearic acid, and other higher fatty acids, hydroxyfatty acids, and other fatty acid mold-release agents; stearic acid amide, ethylenebisstearamide, and other fatty acid amides, alkylenebisfatty acid amides, and other fatty acid amide mold-release agents; stearyl alcohol, cetyl alcohol, and other aliphatic alcohols, polyhydric alcohols, polyglycols, polyglycerols and other alcoholic mold release agents; butyl stearate, pentaerythritol tetrastearate, and other lower alcohol esters of fatty acid, polyhydric alcohol esters of fatty acid, and polyglycol esters of fatty acid, and other fatty acid ester mold release agents; and
(e) from 0 to 1 wt % of a stabilizer selected from the group consisting of acidic phosphate salts; mixed phosphites having at least one acidic hydrogen; Group IB or Group IIB metal phosphate salts, phosphorus oxo acid, metal acid pyrophosphate, tetrakis(2,4-di-tert-butylphenyl)-4, 4'-biphenylene diphosphonite, phosphoric acid;
(f) from 0 to 1 wt % of a polyfunctional carboxy reactive material that is a styrene acrylate copolymer with glycidyl groups; and
(g) from 0 to 1 wt % of an ultraviolet absorber selected from the group consisting of salicylic acid ultraviolet absorbers, benzophenone ultraviolet absorbers, benzotriazole ultraviolet absorbers, cyanoacrylate ultraviolet absorbers and mixtures thereof;
wherein the sum of the wt % of (a), (b), (c), (d), (e), ((f), and (g) is 100 wt %.

18. An article comprising the composition of claim 17, wherein the article is a dishwasher part or bowl.

* * * * *